United States Patent
Nakatani et al.

(10) Patent No.: US 7,397,655 B2
(45) Date of Patent: Jul. 8, 2008

(54) ELECTRONIC APPARATUS

(75) Inventors: Masato Nakatani, Kawaguchi (JP); Yasuyuki Suzuki, Tachikawa (JP); Yosuke Miura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 18 days.

(21) Appl. No.: 11/641,267

(22) Filed: Dec. 18, 2006

(65) Prior Publication Data

US 2007/0146978 A1   Jun. 28, 2007

(30) Foreign Application Priority Data

Dec. 27, 2005   (JP) ............................. 2005-374549

(51) Int. Cl.
   *G06F 1/16* (2006.01)
(52) U.S. Cl. .................... 361/680; 16/321; 379/433.13; 296/37.8
(58) Field of Classification Search ............... 16/321, 16/330, 286, 386; 439/517; 62/298; 379/433.11, 379/428.01; 400/693; 296/37.8, 146.1; 361/679–687, 361/724–727
   See application file for complete search history.

(56) References Cited

U.S. PATENT DOCUMENTS

| | | | |
|---|---|---|---|
| 6,421,878 B1 | 7/2002 | Kaneko et al. | |
| 7,040,245 B1 * | 5/2006 | Nash | 114/201 R |
| 2004/0211036 A1 * | 10/2004 | Park et al. | 16/348 |
| 2005/0115025 A1 * | 6/2005 | Minaguchi et al. | 16/259 |
| 2006/0176652 A1 * | 8/2006 | Lin et al. | 361/679 |

FOREIGN PATENT DOCUMENTS

| | | |
|---|---|---|
| JP | 09-283946 | 10/1997 |
| JP | 11-141536 | 5/1999 |
| JP | 2001-065543 | 3/2001 |

\* cited by examiner

*Primary Examiner*—Hung V Duong
(74) *Attorney, Agent, or Firm*—Blakely, Sokoloff, Taylor & Zafman LLP

(57) ABSTRACT

According to one embodiment, an electronic apparatus has a first housing having a first cover, a second housing having a second cover, and a hinge device. The hinge device connects rotationally the first housing and second housing, and has a hinge shaft, a first arm and a second arm. The first arm is covered by the first cover, and one end is connected to the hinge shaft, and the other end is fixed to the first housing. The second arm is covered by the second cover, and one end is connected to the hinge shaft, and the other end is fixed to the second housing. The first cover and second cover have opposed parts around the hinge shaft, and have a projection which is provided in one opposed part, and slidingly contacts the other opposed part.

8 Claims, 11 Drawing Sheets

ELECTRONIC APPARATUS

CROSS-REFERENCE TO RELATED APPLICATIONS

This application is based upon and claims the benefit of priority from Japanese Patent Application No. 2005-374549, filed Dec. 27, 2005, the entire contents of which are incorporated herein by reference.

BACKGROUND

1. Field

One embodiment of the invention relates to a folding electronic apparatus with two housings connected by a hinge.

2. Description of the Related Art

There is a portable apparatus composed of a computer unit having a keyboard and a display unit containing a liquid crystal display connected by a hinge device. Such an apparatus is disclosed in Japanese patent No. 3521168, for example. A display unit of this portable apparatus contains a liquid crystal display, and has a display housing having a foot inserted into a base provided in a main body.

A hinge device has a hinge shaft penetrating the sides of the base and foot. On the side of the base opposite to the hinge shaft penetrated side, a cylinder is provided extending from the base side to the foot along the hinge shaft. At the foot of the display housing corresponding to the cylinder, a through hole is opened a size larger than the cylinder to loosely fit the cylinder. Also disclosed is another embodiment having a base and a foot reversed in the projection-depression relation.

As the size of a display device contained in a display unit is enlarged, the weight of a display unit becomes heavy. Thus, a hinge device with a large rotational resistance is used to hold a display unit at an optional rotational angle. When a display unit is moved rotationally to a main body in such an apparatus, the size of a display device is also increased, even if the rotational resistance of a hinge device is increased. Hence, and the user does not feel stiffness in operation.

However, actually, the rotational resistance of a hinge device is large. Therefore, when a display is moved rotationally, a hinge device receives a large load in the area from the arm fixed part to the hinge shaft. As a result, a display housing may be bent or twisted, and the main body and display unit may interfere with or rub each other in an unexpected area during rotation of the display unit. This may disturb smooth movement of the display unit.

When the rotational resistance of a hinge device is small, a clearance is made between parts, like a base and a foot in Japanese patent No. 3521168. Therefore the interference may be prevented. However, when the rotational resistance of a hinge device is increased, a bend or twist is also increased, and it is necessary to take a larger clearance to prevent this problem. However, if a clearance is increased, the appearance becomes not good. Further, a load causing the bend or twist is not decreased, and a stress concentrates on a part as a base point of bend or twist, causing damage in that part.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
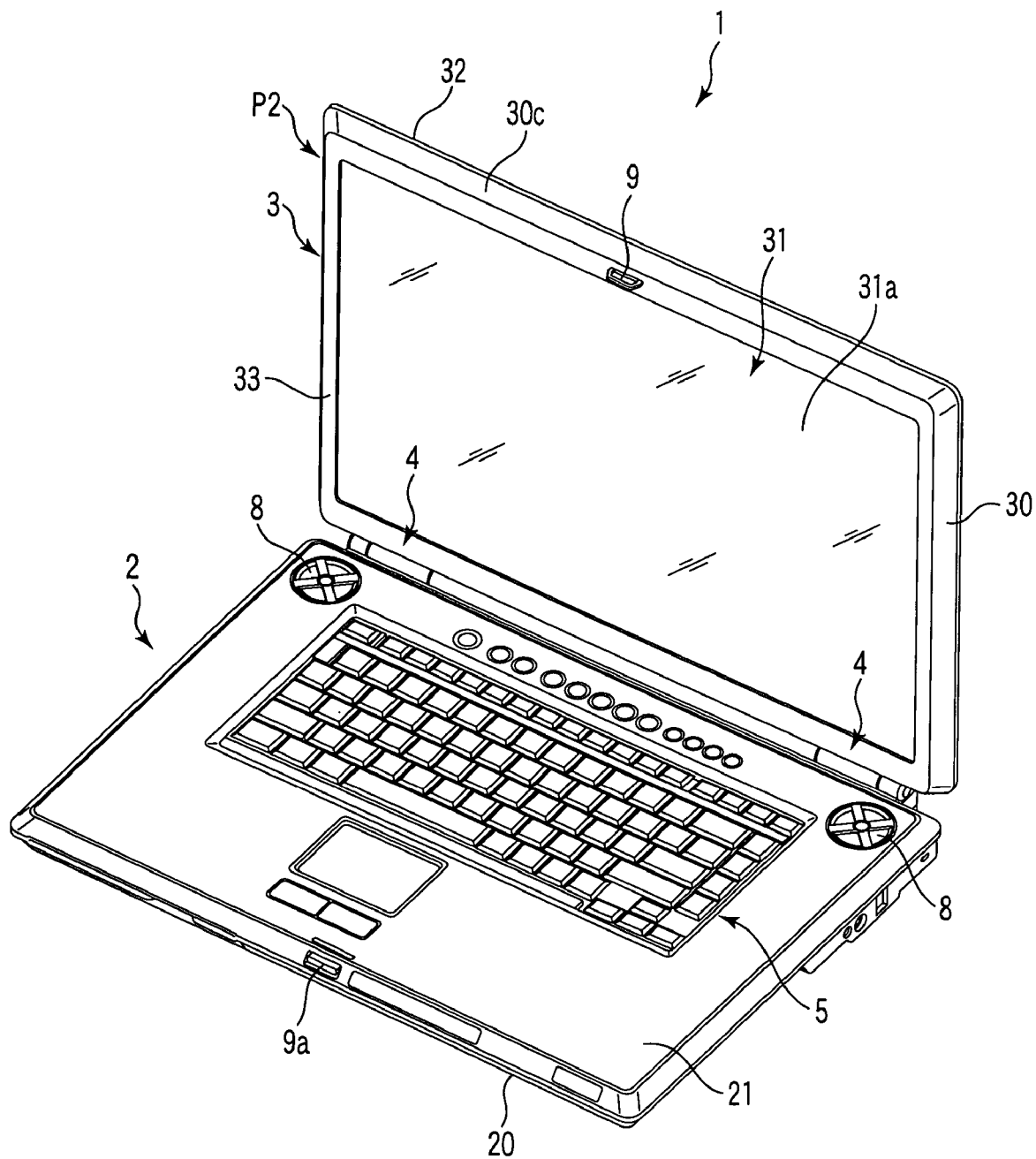
FIG. 1 is an exemplary perspective view of an example of an electronic apparatus according to an embodiment of the invention.

According to an aspect of the invention, there is provided an electronic apparatus, which uses a hinge device with a large rotational resistance, and smoothly moves a display unit rotationally to a main body.

An electronic apparatus has a first housing having a first cover, a second housing having a second cover, and a hinge device. The hinge device connects rotationally the first housing and second housing, and has a hinge shaft, a first arm and a second arm. The first arm is covered by the first cover, and one end is connected to the hinge shaft, and the other end is fixed to the first housing. The second arm is covered by the second cover, and one end is connected to the hinge shaft, and the other end is fixed to the second housing. The first cover and second cover have opposed parts around the hinge shaft, and have a projection which is provided in one opposed part and slidingly contacts the other opposed part.

An electronic apparatus prevents a bend or twist applied to an area around a hinge device, even if a hinge device with a large rotational resistance is used, and smoothly moves a display unit rotationally to a main body.

An electronic apparatus 1 according to an embodiment of the invention will be explained with reference to FIG. 1 to FIG. 11. The electronic apparatus 1 shown in FIG. 1 has a main body 2, and a display unit 3. A pair of hinge units 4 is provided at both left and right ends along the rear edge of the electronic apparatus 1 viewed from the user. The hinge unit 4 connects the display unit 3 rotationally to the main body 2. For convenience of explanation, the right, left, front and back sides of the main body 2 are defined viewed from the user side, in the state put the main body 2 on a table, and the vertical direction is defined as upper and lower directions.

The main body 2 has a main body housing 20, which forms an outer frame as a first housing. The main body housing 20 contains a substrate mounted with electronic components, such as an MPU and a large-capacity storage medium. In an upper part 2a of the main body 2, a keyboard 5 is provided as an input means.

The display unit 3 has a display housing 30, which forms an outer frame as a second housing. The display unit 3 contains a display device 31 in the direction that the user can view a display surface 31a. The display housing 30 consists of a cover 32 and a mask 33. The cover 32 covers the rear side of the display device 31. The mask 33 covers the periphery of the display surface 31a viewed from the user.

Figure 4:
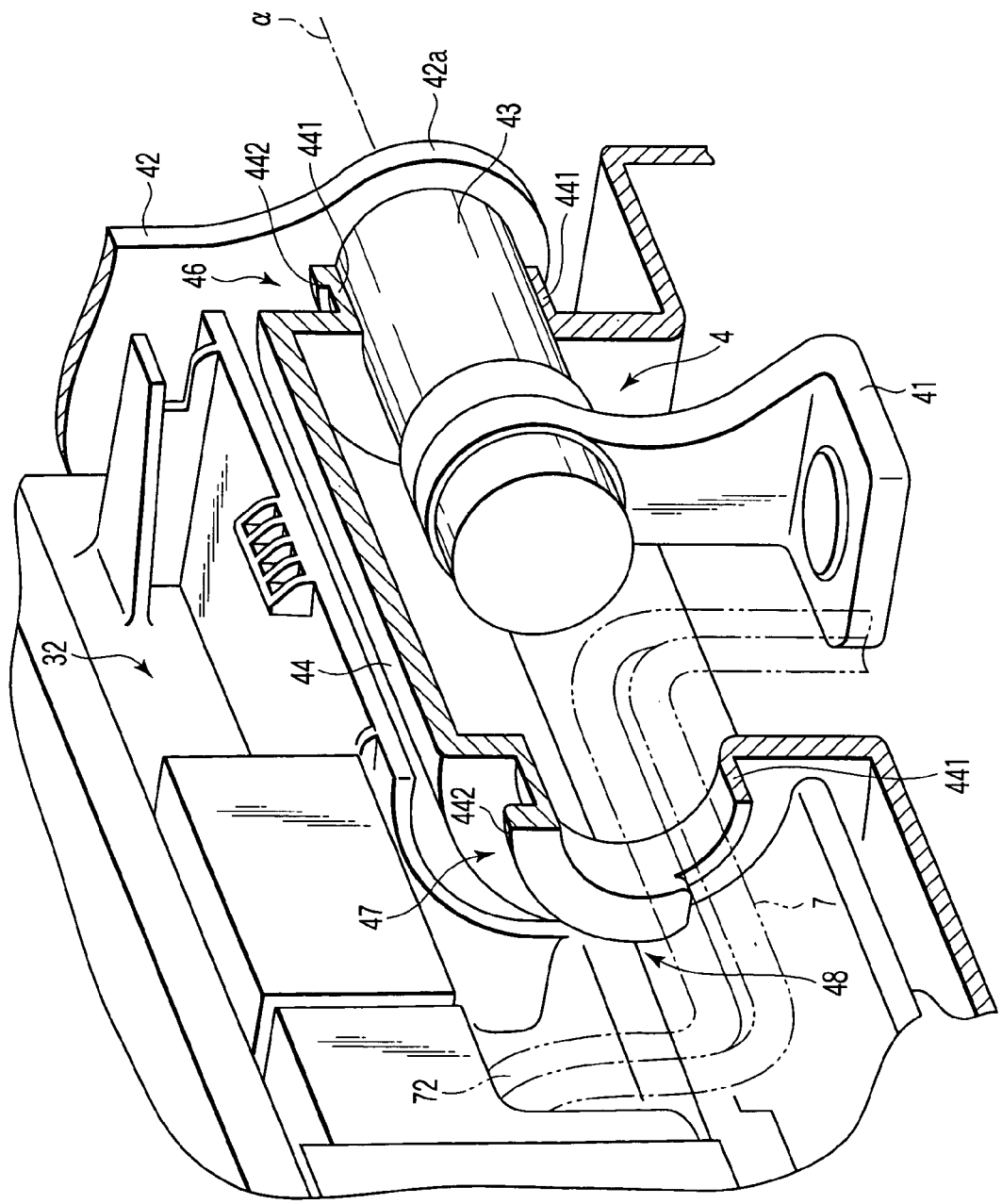
FIG. 4 is an exemplary perspective view of an opposed part of a main body shown in cross section on a plane along the center of rotation of the hinge unit shown in FIG. 2 in the embodiment.

The hinge unit 4 connects the display unit 3 to the main body 2 movably from a closed state P1 laid over the main body 2 to an open state P2 standing up relative to the main body 2. A hinge device 40 is incorporated in the hinge unit 4. The hinge device 40 has a first arm 41, a second arm 42, and a hinge shaft, as shown in FIG. 4.

The first arm 41 extends from the hinge shaft 43, and is fixed to the main body housing 20 through a hinge base 41a. The hinge base 41a spreads from the hinge unit 4 along the inside of an upper wall 21 of the main body housing 20.

Figure 2:
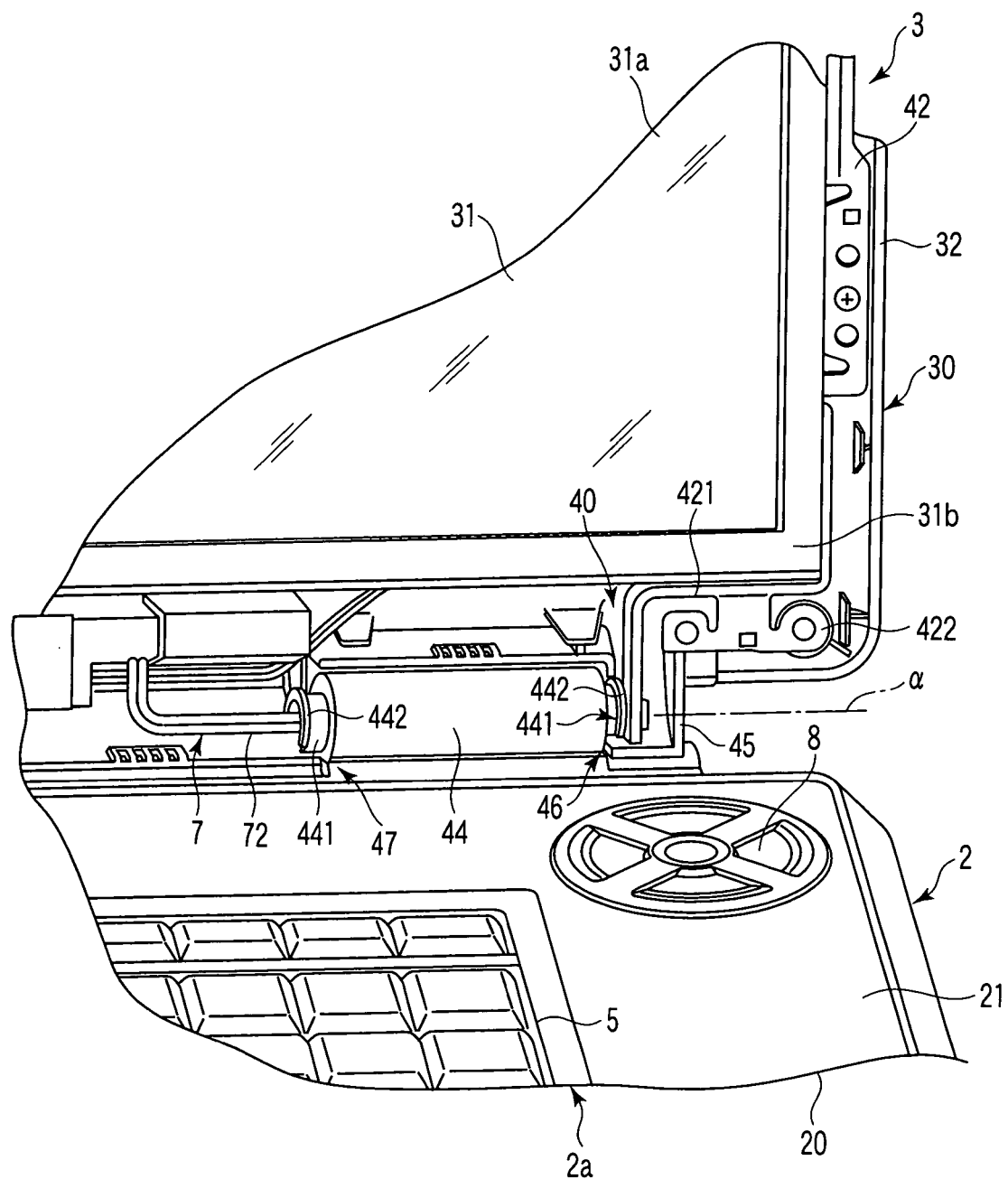
FIG. 2 is an exemplary enlarged perspective view of a right-side hinge unit in the state that a mask of a display unit of the electronic apparatus shown in FIG. 1 is removed in the embodiment.
Figure 3:
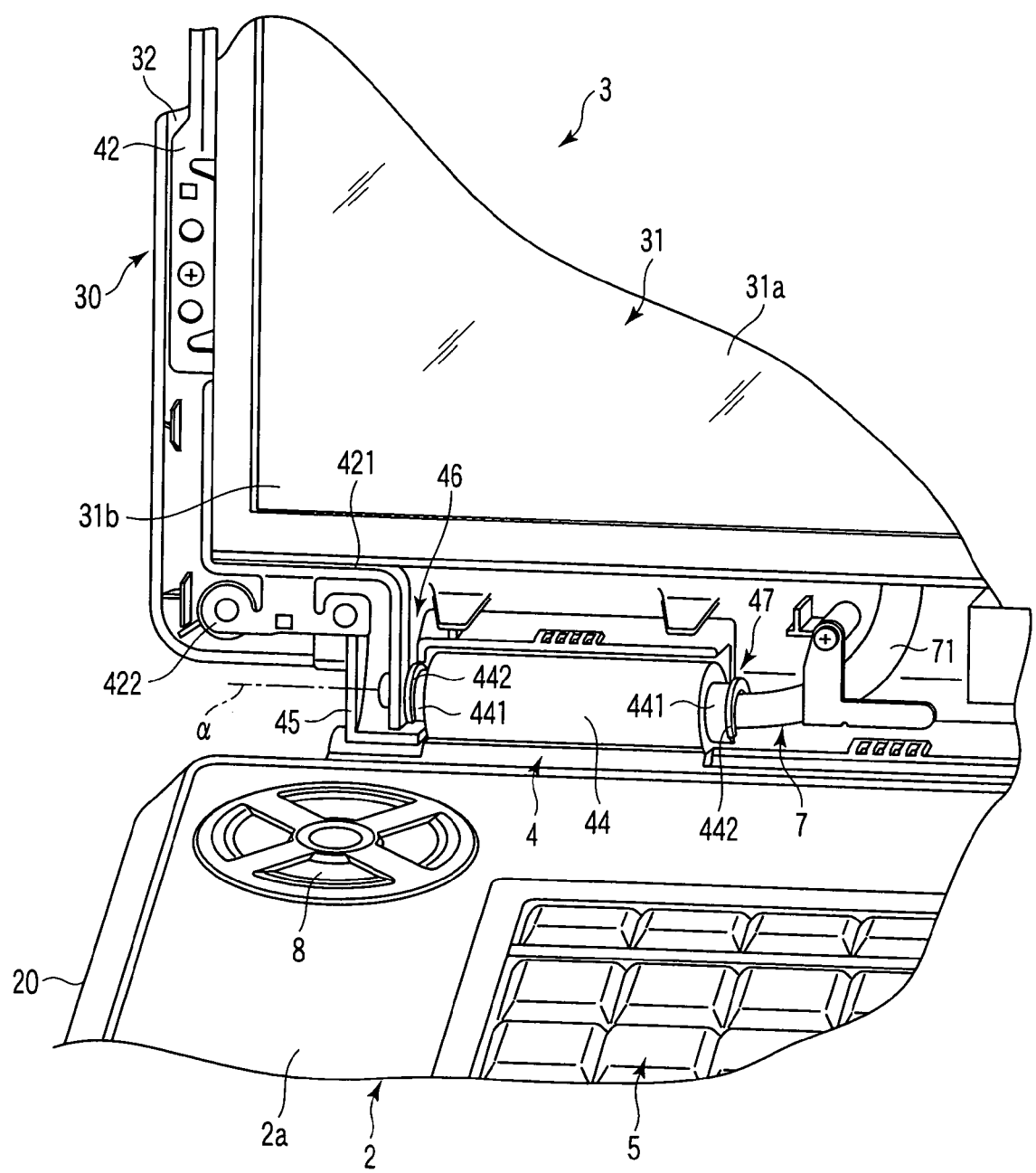
FIG. 3 is an exemplary enlarged perspective view of a left-side hinge unit in the state that a mask of a display unit of the electronic apparatus shown in FIG. 1 is removed in the embodiment.

The second arm 42 extends from the hinge shaft 43 to the inside of the outer periphery of the cover member 32 along the periphery of the display device 31. The second arm 42 is fixed to the cover member 32 at several positions up to the distal end. The second arm 42 has a lateral part 421 bending halfway in the direction along the hinge shaft 43, to go around a corner 31b of the display device 31. A fixing member 422 of the second arm 42 closest to the hinge shaft 43 is provided in the bent lateral part 421, as shown in FIG. 2 and FIG. 3.

The hinge shaft 43 pivots the first arm 41 and second arm 42. The hinge shaft 43 has a rotational resistance sufficient to support the display unit 3 at an optional angle between the closed state P1 and the open state P2, with respect to the main body 2.

The first arm 41 close to the hinge device 40 is covered by the first cover 44 extending from the main body housing 20. The second arm 42 close to the hinge device 40 is covered by a second cover 45 extending from the display housing 30. The hinge unit 4 has opposed parts 46 and 47 between the first cover 44 and second cover 45. In this embodiment, the second cover 45 is rotationally fit at the outside of the first cover 44.

In the opposed parts 46 and 47 between the first cover 44 and second cover 45, a cable 7 is routed from the main body housing 20 to the display housing 30 through in the opposed part 47 facing to the opposed part 46 penetrated the hinge shaft 43 along an axis α. The cable 7 connects the electronic components contained in the main body 2 to the electronic component contained in the display unit 3. The electronic components contained in the main body 2 include semiconductor elements, such as an MPU, GPU, capacitors, and substrate on which to mount these components. The electronic component contained in the display unit 3 is a display device 31, for example.

The cable 7 may be a communication cable 71 shown in FIG. 3 routed from a substrate to the display device 31, a power cable 72 shown in FIG. 2 supplied as backlight of the display device 31, or an antenna cable connected to an antenna contained in the display unit 3.

Figure 5:
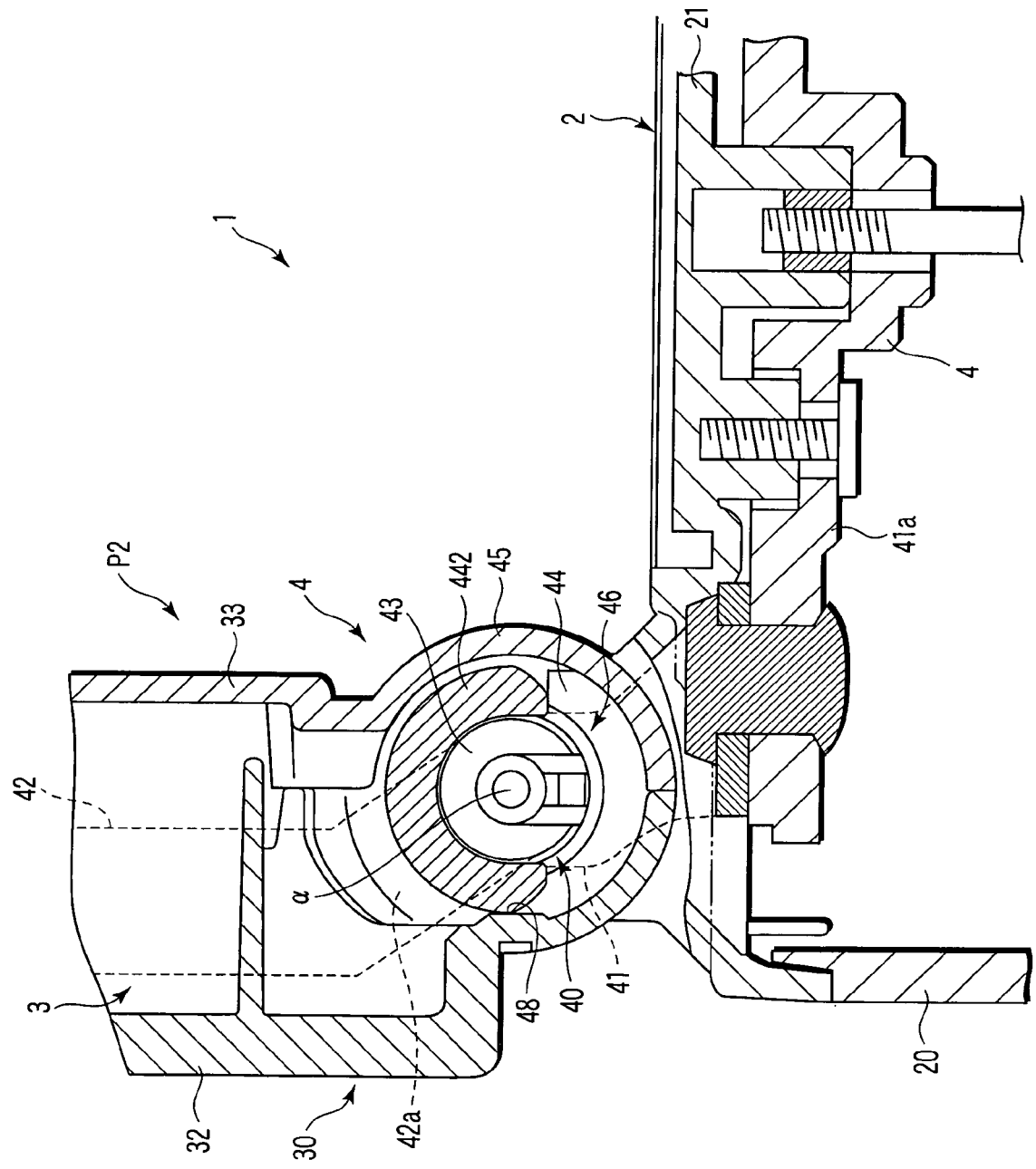
FIG. 5 is an exemplary sectional view of a crimping part to fix a rib and a main body side arm of the hinge unit shown in FIG. 4, to a base plate in the embodiment.

The first cover 44 has a sleeve 441 and a rib 442, in the right-side hinge unit 4 shown in FIGS. 2 and 4, and in the left-side hinge unit 4 shown in FIG. 3. The sleeve 441 extends in both directions along the hinge shaft 43. The rib 442 spreads from the end of the sleeve 441 in the radial direction of the hinge shaft 43. The rib 442 is provided in at least the upper half of the sleeve 441 with respect to the hinge shaft 43, as shown in FIG. 5.

The second cover 45 has a projection 48 slidingly contacting the rib 442, in the inside surface. The projection 48 is provided in the inside surface located immediately behind the hinge shaft 43 in the state that the display unit stands on straight to the main body 2, as shown in FIG. 5. The projection 48 contacts the rib 442 at the position immediately above the hinge shaft 43, in the closed state P1 of the display unit 3, as shown in FIG. 6.

Now, an explanation will be given on a force applied to the display housing 30 when rotationally moving the display unit 3 from the closed state P1 to the open state P2, or from the open state P2 to the closed state P1, in the electronic apparatus 1 configured as described above, and a behavior caused by the force, with reference to FIG. 6 to FIG. 11.

Figure 6:
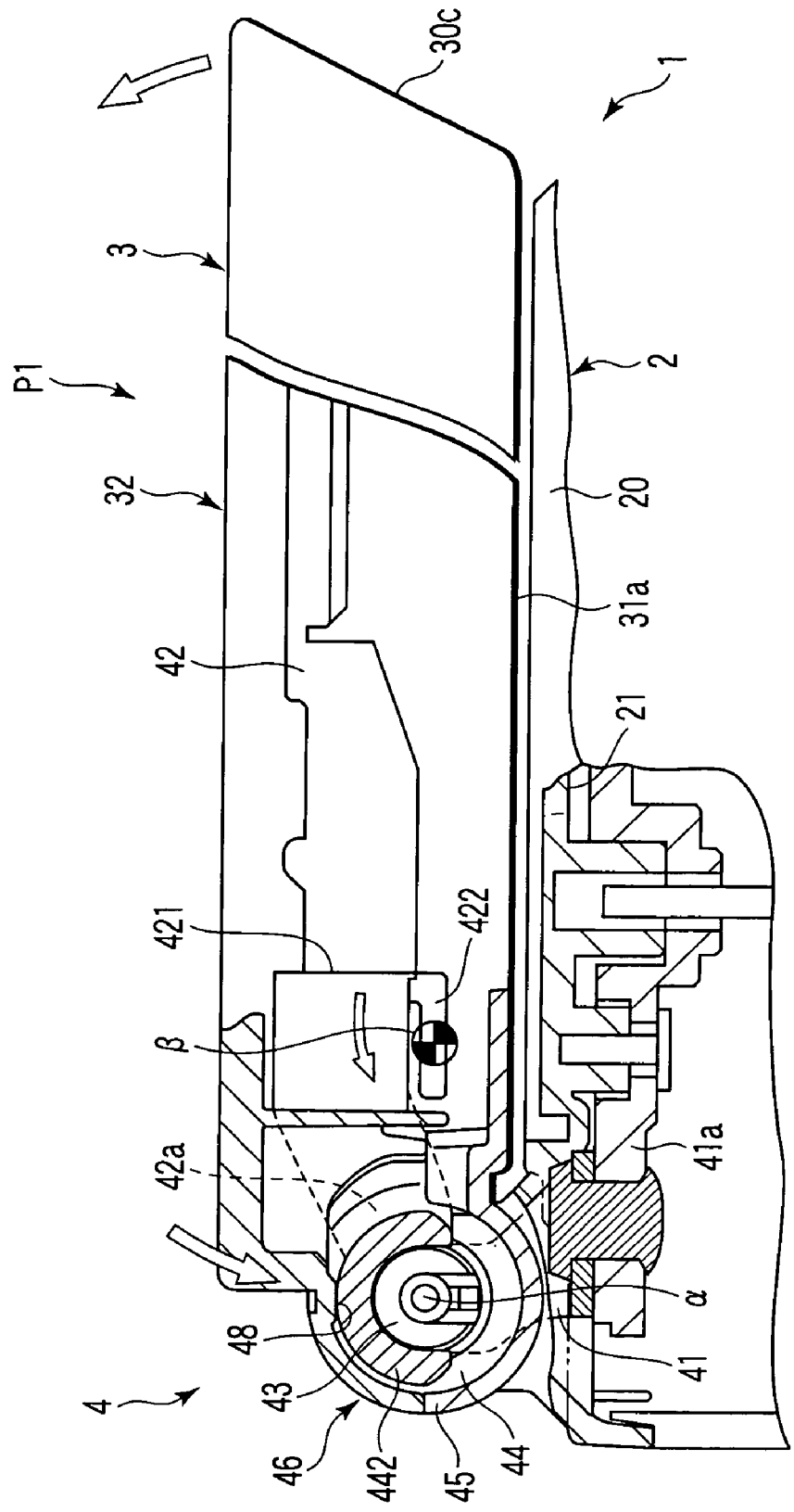
FIG. 6 is an exemplary sectional view showing a force in the hinge unit shown in FIG. 5, acting on a display unit, when a display unit is urged from a closed state to an open state in the embodiment.

When raising the display unit 3 of the electronic apparatus 1 from the close state P1 shown in FIG. 6, to the open state P2, the user holds the edge 30c of the display unit 3 separated away from the hinge shaft 43 so as to raise the unit by a small force. The display housing 30 is stopped at the fixing member 422 with respect to the second arm 42. When containing the large-size display device 31 in the display unit 3, the rotational resistance of the hinge device 40 is set to the strength sufficient to support the weight of the display device 31.

The user moves the display unit 3 rotationally against the holding force based on the coefficient of static friction around the hinge shaft 43, until the hinge device 40 begins to move. In this case, a coupling member closest to the hinge shaft 43 in the display housing 30 is the fixing unit 422 of the second arm 42. Therefore, the force applied by the user to the display unit 3 acts as a rotational moment about the axis β passing through the fixing member 422 parallel to the hinge shaft 43. The own weight of the display unit 3 acts on the display unit 3. Therefore, when the user holds and raises the edge 30c of the display unit 3 positioned in the front side in the closed state P1 shown in FIG. 6, a rotational moment due to gravity is further added.

As a result, a part of the display housing 30 closer to the hinge shaft 43 than the fixing member 422, particularly the second cover 45, is urged in the direction coming close to the main body housing 20. In this case, if the second cover 45 does not contact the first cover 44, the display housing 30 is twisted around the fixing member 422.

The hinge unit 4 of the electronic apparatus 1 of this embodiment has a projection 48 slidingly contacting the peripheral surface of the first cover 44, in the inside surface of the second cover 45, as shown in FIG. 5-FIG. 8. The projection 48 projects from the inside of the second cover 45 to the peripheral surface of the first cover 44, in the direction opposite to the force applied to the distal end of the second arm 42 in the rotating direction of the hinge device 40 around the fixing member 422.

Namely, the projection 48 contacting the rib 442 of the first cover 44 can receive a reaction force to the twist around the fixing member 422 by the force applied in the opening direction. Therefore, the display unit 3 can cancel the rotational moment acting on the fixing member 422, and displacement does not occur between the first cover 44 and second cover 45 in the hinge unit 4. As a result, the main body housing 20 and display housing 30 do not interfere in an unexpected part. Further, even if the display unit 3 begins to move rotationally about the hinge shaft 43, as the projection 48 is provided in the display unit 3, the contact between the projection 48 and first cover 44 is kept in a certain relation with respect to the fixing member 422. Therefore, the display unit 3 is smoothly moved rotationally to the hinge shaft 43.

In the closed state shown in FIG. 6, the display unit 3 is laid over substantially parallel to the main body 2. When the display unit is urged in the opening direction, the forces applied to second arm 42 and the hinge base 41a fixing the first arm 41 direct are substantially in the opposite direction, and act along the direction of gravity.

When moving the display unit 3 from the closed state P1 in the opening direction, it is necessary to release a latch 9 provided between the display unit 3 and the main body 2 before the moving operation. The latch 9 often has an operating part 9a at substantially the center of the edge that is the front side. In this embodiment, the latch is provided in the main body 2. Therefore, when operating from the closed state P1 in the opening direction, the user holds and raises substantially the central portion of the display unit 3.

Figure 7:
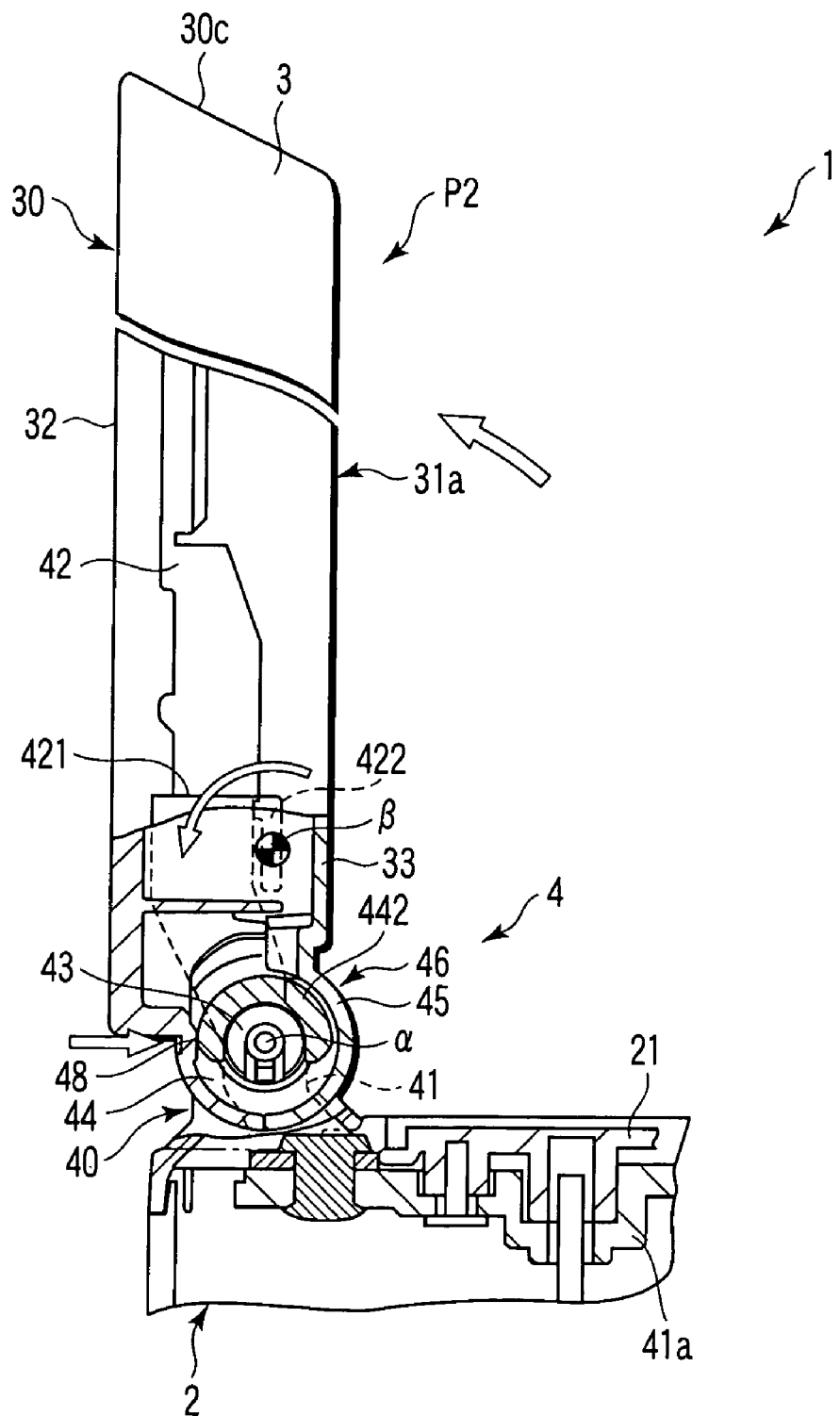
FIG. 7 is an exemplary sectional view showing a force in the hinge unit shown in FIG. 5, acting when a display unit receives a force rotating in an opening direction in an open state standing up straight relative to a main body in the embodiment.
Figure 8:
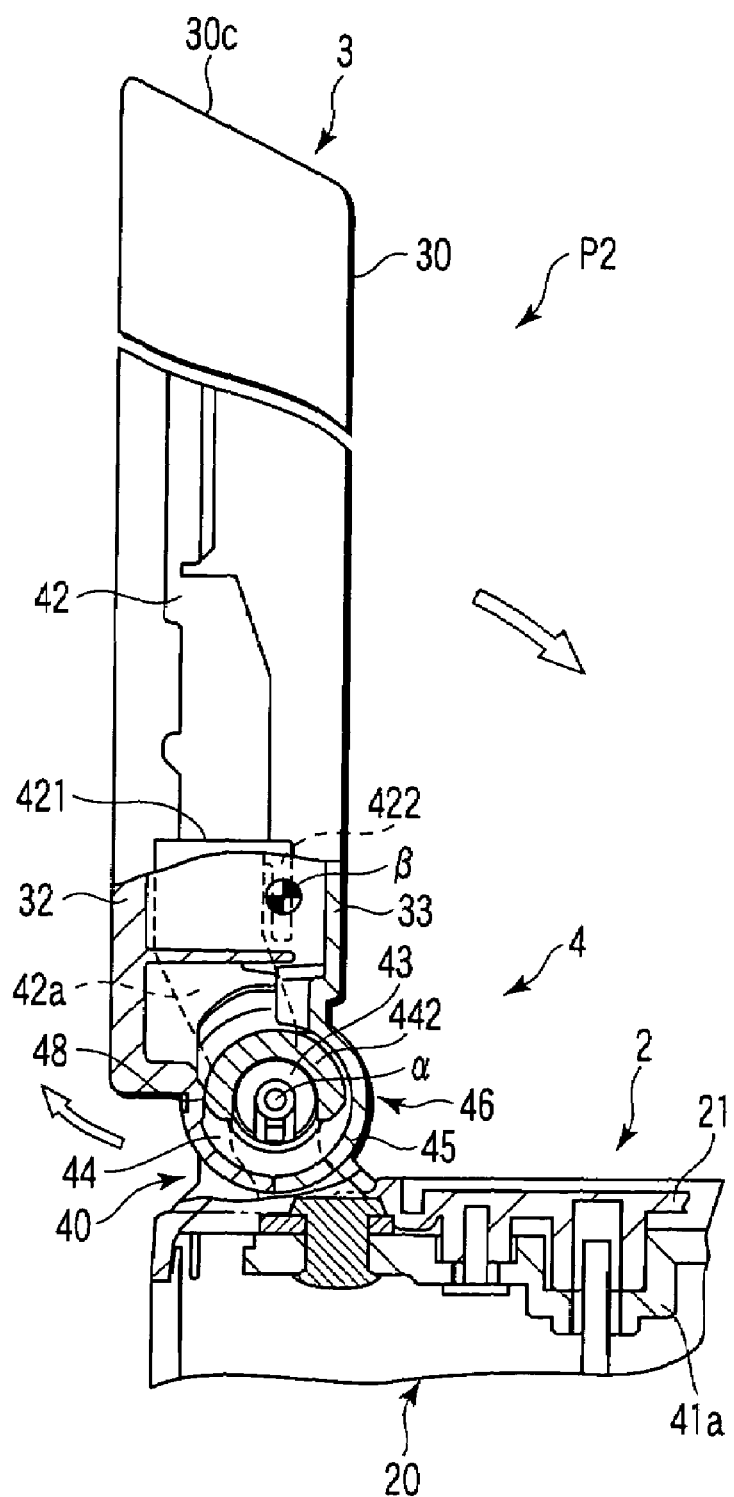
FIG. 8 is an exemplary sectional view showing a force in the hinge unit shown in FIG. 5, acting when a display unit receives a force rotating in a closing direction in an open state standing up straight relative to a main body in the embodiment.
Figure 9:
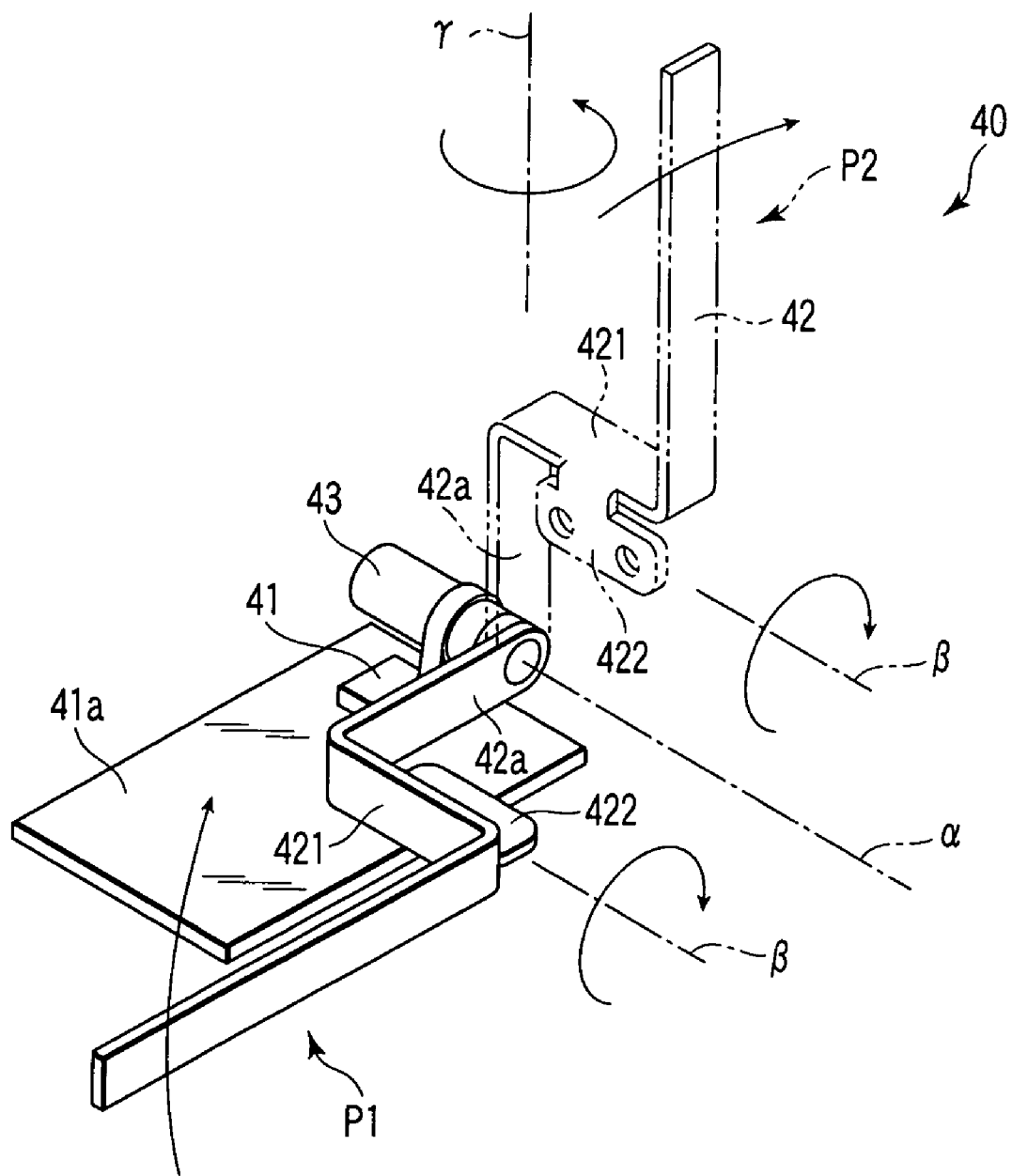
FIG. 9 is an exemplary perspective view of a twist acting on the hinge device shown in FIG. 3 in embodiment.

Conversely, in the open state P2 that the display unit 3 stands up straight to the main body 2 as shown in FIG. 7 and FIG. 8, a force to move the display unit 3 is applied in the back or forth direction. The second arm 42 is bent parallel to the hinge shaft 43 halfway, just like going around the corner 31b of the display unit 31. Therefore, the hinge unit 4 receives also a rotational moment about the axis γ extending upward passing through the base 42a of the second arm 42, in addition to a rotational moment about the axis β passing through the fixing member 422 parallel to the hinge shaft 43, as shown in FIG. 9.

Figure 10:
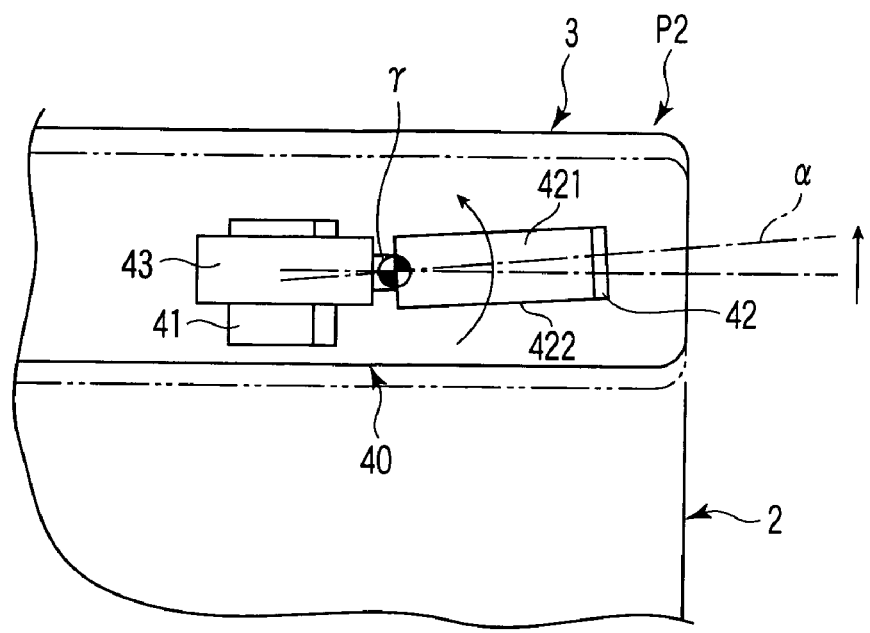
FIG. 10 is an exemplary top plane view of a force acting in an opening direction of the hinge device in the open state shown in FIG. 9 in the embodiment.

The display unit 3 is fixed also at several positions in the second arm 42 extending along the side of the display device 31. As shown in FIG. 7, when the edge 30c of the display unit 3 is moved further in the opening direction while the display unit 3 is standing up straight, the second arm 42 is bent about the axis γ passing through the base 42a of the second arm 42. As a result, the whole display unit 3 is urged rearward with respect to the main body 2, as shown in FIG. 10. The dimension of displacement of the second cover 45 rearward by the rotational moment applied to the fixing member 422 substantially cancels the dimension of displacement of the second cover 45 rearward by the bending of the second arm 42.

Figure 11:
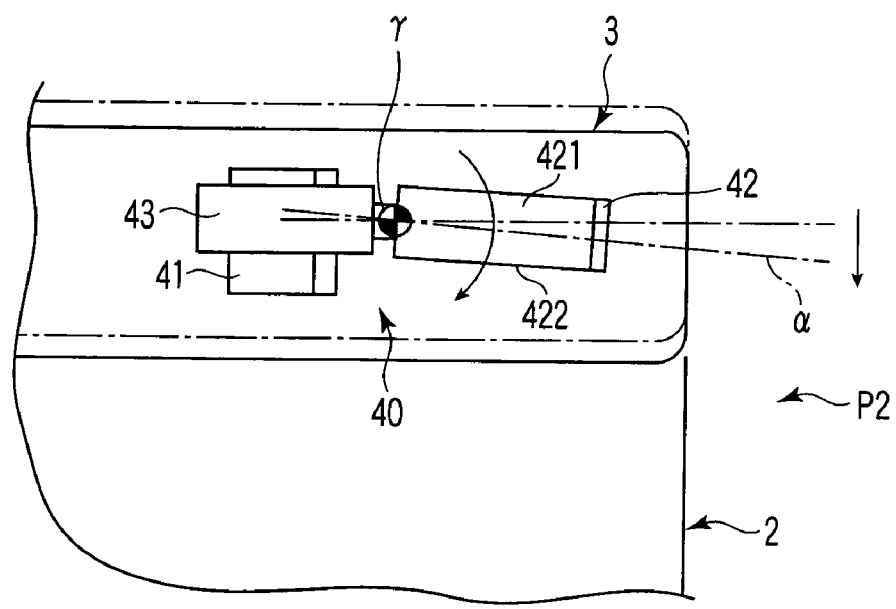
FIG. 11 is an exemplary top plane view of a force acting in a closing direction of the hinge device in the open state shown in FIG. 9 in the embodiment.

Next, an explanation will be given on the operation of moving the display unit 3 from the open state P2 standing up straight relative to the main body 2, in the closing direction by holding the edge 30c of the display unit 3, as shown in FIG. 8. The display unit 3 receives a rotational moment about the axis β passing through the fixing member 422 parallel to the hinge shaft 43, as shown in FIG. 8, and is urged forward when the second arm 42 is bent, as shown in FIG. 11.

As a result, in the opposed parts 46 and 47 of the hinge unit 4, the dimension of displacement of the second cover 45 rearward by the rotational moment about the fixing member 422 is substantially cancelled by the dimension of displacement forward by the bending of the second arm 42. As the display unit 3 is moved rotationally to the closed state P1, the display unit 3 begins to be acted on by gravity. As the displacement by the rotational moment about the fixing member 422 is canceled by the displacement by the weight in the operation of rotationally moving the display unit 3 in the closing direction, substantially no displacement is applied to the hinge unit 4.

As explained above, by summarizing the behavior of the display unit 3 in the operations of moving in the opening direction and the closing direction, it is seen that an effect of preventing displacement of the hinge unit 4 can be obtained by simply placing the projection 48 provided in the opposed parts 46 and 47 of the hinge unit 4, on the inside surface of the second cover 45 extending from the display unit 3, particularly, in the part above the hinge shaft 43 in the closed state P1, in other words, in the part located in the rear side of the hinge shaft 43 in the state that the display unit 3 stands up straight.

Figure 12:
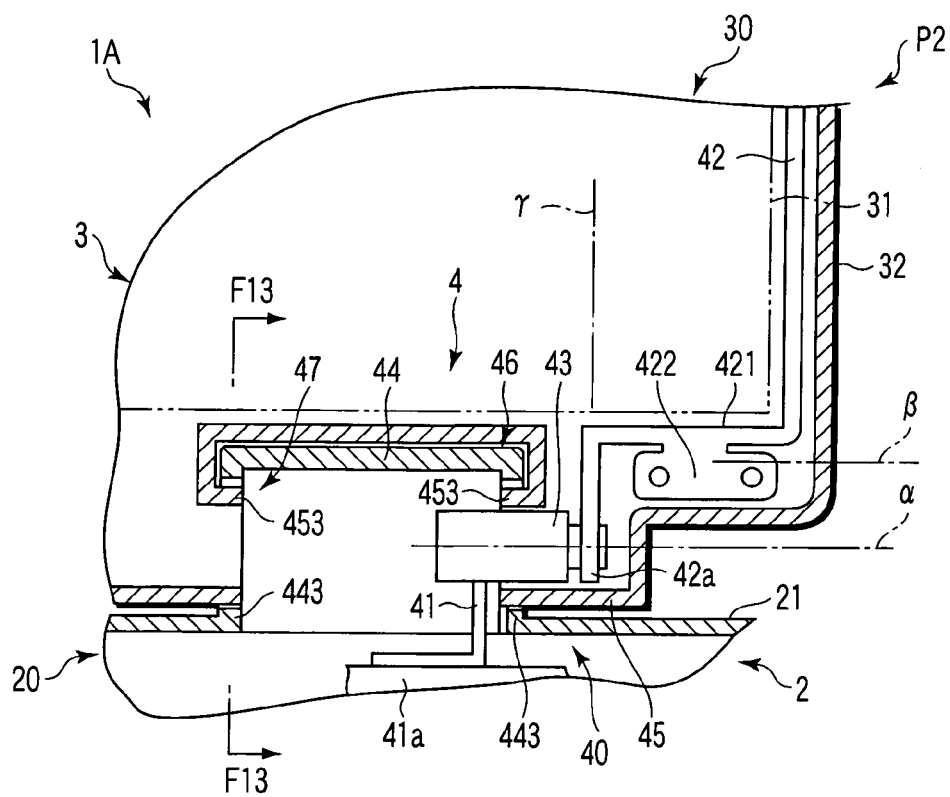
FIG. 12 is an exemplary sectional view of an example of a hinge unit of an electronic apparatus according to a second embodiment of the invention, along a hinge shaft.

Now, an explanation will be given on an electronic apparatus 1A according to a second embodiment of the invention with reference to FIG. 12 and FIG. 13. The same reference numbers are given to the same components as those having the same functions in the electronic apparatus 1 of the first embodiment, and detailed description will be omitted. The second embodiment is different from the first embodiment in the configuration of a hinge unit 4A. The other aspects are the same as in the first embodiment, and description will be omitted.

The hinge unit 4A of this embodiment has a rib 443, a sleeve 453, and a projection 481. The rib 443 extends from the end of the first cover 44 to the second cover 45. The sleeve 453 extends from the second cover 45 in the direction along the hinge shaft 43. The projection 481 is provided on the peripheral surface of the sleeve 453.

Figure 13:
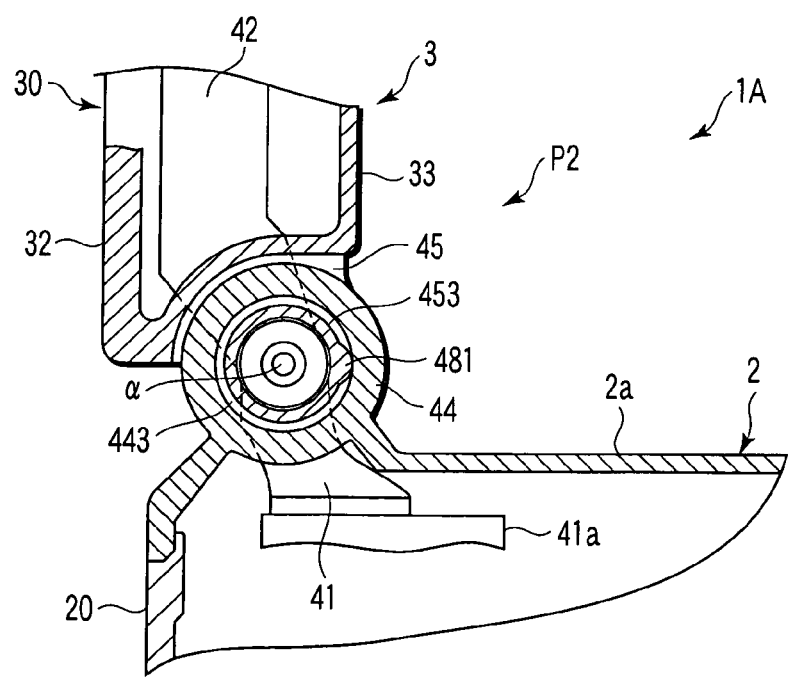
FIG. 13 is an exemplary sectional view of the hinge unit taken along lines F13-F13 in FIG. 12 in the embodiment.

The projection 481 is provided in the part below the hinge shaft 43 in the closed state P1 of the display unit 3, in other words, in the part that is the front side of the hinge shaft 43 in the open state P2 as shown in FIG. 13, and slidingly contacts the rib 443. As configured above, the hinge unit 4A has the same function as the hinge unit 4 of the first embodiment.

When the display unit 3 is moved rotationally in a range between the closed state P1 and open state P2 as in the first and second embodiments, the hinge unit 4A may simply satisfy the following conditions. When moving rotationally the display unit 3 from the closed state P1 to the open state P2, the hinge unit 4A may have projections 48 or 481 in the side symmetrical to the side to move rotationally to the hinge shaft 43, around the fixing element 422 provided at a position between the hinge shaft 43 and a position to apply a force to move rotationally. When the display unit 3 is moved rearward from the open state P2 standing up straight relative to the main body 2, to separate farther from the user, the display unit 3 is acted on by gravity. Therefore, the hinge unit 4A desirably has a projection in the same side as the side to move rotationally the hinge shaft 43.

When the weight of the display unit 3 is received in a horizontal position at the projection, as in the first and second embodiments, it is effective to provide the projection in the first cover 44. When the first cover 44 is fit at the outside of the second cover 45, provide the projection under the hinge shaft 43. When the first cover 44 is inserted into the inside of the second cover 45, provide the projection above the hinge shaft 43.

In the electronic apparatus 1 of the first embodiment, a speaker 8 is provided in proximity with the hinge unit 4. The main body housing 20 of the main body 2 for a first housing and the display housing 30 of the display unit 3 for a second housing are kept in contacting the projection 48 provided in the opposed part 46 of the first cover 44 and second cover 45. Therefore, even if the speaker 8 with a large output is provided, a rattling noise caused by the vibration of the speaker 8 is prevented in the housings.

The invention is not limited to the foregoing embodiment but various changes and modifications of its components may be made without departing from the scope of the present invention. Also, the components disclosed in the embodiment may be assembled in any combination for embodying the present invention. For example, some of the components may be omitted from all the components disclosed in the embodiment. Further, components in different embodiments may be appropriately combined.

What is claimed is:

1. An electronic apparatus comprising:
   a first housing having a first cover;
   a second housing having a second cover;
   a hinge device which connects rotationally the first housing and second housing, and has a hinge shaft, a first arm covered by the first cover with one end connected to the hinge shaft and the other end fixed to the first housing, and a second arm covered by the second cover with one end connected to the hinge shaft and the other end fixed to the second housing; and
   opposed parts which are formed around the hinge shaft, with a part of the first cover and a part of the second cover opposed to each other, the opposed parts having a projection provided in one opposed part and slidingly contacting the other opposed part.

2. The electronic apparatus according to claim 1, wherein the other opposed part has a rib slidingly contacting the projection.

3. The electronic apparatus according to claim 1, wherein the opposed part in the second cover is fit at the outside of the opposed part in the first cover, and the projection is provided on the inside surface of the second cover, and slidingly contacts the peripheral surface of the first cover.

4. The electronic apparatus according to claim 3, wherein the first housing is a main body having a keyboard provided on the upper surface, and the second housing is a display unit containing a display device.

5. The electronic apparatus according to claim 3, wherein the projection is provided on the surface of the opposite side of the second housing facing the first housing.

6. The electronic apparatus according to claim 5, wherein the first cover has a rib extending in the radial direction of the hinge shaft in a range slidingly contacting the projection when the second housing is moved rotationally.

7. The electronic apparatus according to claim 1, wherein the opposed part of the first cover is fit at the outside of the opposed part of the second cover, and the projection is provided on the peripheral surface of the second cover, and slidingly contacts the inside surface of the first cover.

8. The electronic apparatus according to claim 7, wherein the first housing is a main body having a keyboard provided on the upper surface, and the second housing is a display unit containing a display device.

* * * * *